United States Patent [19]

Minegishi

[11] Patent Number: 5,286,237
[45] Date of Patent: Feb. 15, 1994

[54] INSCRIBED MESHING PLANETARY GEAR CONSTRUCTION

[75] Inventor: Kiyoji Minegishi, Aichi, Japan
[73] Assignee: Sumitomo Heavy Industries, Ltd., Tokyo, Japan
[21] Appl. No.: 928,124
[22] Filed: Aug. 11, 1992
[30] Foreign Application Priority Data Aug. 13, 1991 [JP] Japan .................... 3-228339
Aug. 13, 1991 [JP] Japan .................... 3-228341

[51] Int. Cl.⁵ ........................................ F16H 1/28
[52] U.S. Cl. ........................................... 475/178
[58] Field of Search ........................... 475/178, 179

[56] References Cited

U.S. PATENT DOCUMENTS 4,471,672 9/1984 Butterfield et al. ......... 475/178 X
4,484,496 11/1984 Weis .......................... 475/178 X
4,567,790 2/1986 Butterfield et al. ......... 475/179 X

FOREIGN PATENT DOCUMENTS 1351031 3/1962 France .
1359792 3/1962 France .

Primary Examiner—Dirk Wright
Attorney, Agent, or Firm—Nikaido, Marmelstein, Murray & Oram

[57] ABSTRACT

In order to improve rigidity and stability, shorten a whole length, reduce the number of component parts and assembling steps in an inscribed meshing planetary gear construction, a flange part 114 of an output shaft 102 inner pins 107 and support ring 117 are supported at both ends by bearings 115a and 115b, and then a reduction mechanism part is assembled between bearings 115a and 115b. Axial position of the inner pins 107 are set by inner rings 124a and 124b of the bearings 115a and 115b. Subsequently, with respect to inner pins 107, it is not necessary to provide any shoulder or treading, and the shape is allowed to be simplified, so that machining for high hardness and high accuracy can be realized at low cost, and then a predetermined quality can be secured together with both supporting structures without requiring any expensive inner rollers. This constitution can also be applied in the inscribed meshing planetary gear construction having a carrier pin 116.

3 Claims, 13 Drawing Sheets

INSCRIBED MESHING PLANETARY GEAR CONSTRUCTION

BACKGROUND OF THE INVENTION

1. Field of the Invention

This invention relates to an inscribed meshing planetary gear construction which is preferably applied to a speed increasing gear or a reduction gear, more particularly, a small-sized speed increasing gear or a reduction gear in which a high output is required.

2. Description of the Prior Art

In the prior art, it is widely known to provide a speed increasing gear or a reduction gear employing an inscribed meshing planetary gear construction comprising a first shaft, an external-tooth gear assembled on the first shaft through a eccentric body in a state where the external-tooth gear can be rotated eccentric around the first shaft, an internal-tooth gear with which the external-tooth gear is inscribed and meshed, and a second shaft connected to the external-tooth gear through means for transmitting only the rotation component of the external-tooth gear.

An example of the prior art of this construction is shown in FIGS. 9 and 10. This prior art is constructed such that said first shaft is considered as an input shaft, said second shaft is considered as an output shaft and at the same time said construction is considered to a reduction gear by fixing the internal-tooth gear.

Eccentric bodies 3a, 3b are fitted on to the input shaft 1 with a predetermined phase difference (180° in this example). The eccentric bodies 3a, 3b are integrated into one body. Two external-tooth gears 5a, 5b are placed on to each of these eccentric bodies 3a, 3b through eccentric bearings 4a, 4b. A plurality of inner roller holes 6 are provided in the external-tooth gears 5a, 5b. Also, an inner pin 7 and inner roller 8 are fitted in these roller holes.

A main object of providing two external-tooth gears (plural rows) is to increase a transmittance capacity, maintain a strength and keep a rotational balance.

External teeth 9 such as trochoidal or circular teeth etc. are provided at outer circumferences of said external-tooth gears 5a, 5b. The external teeth 9 are inscribed and meshed with the internal-tooth gear 10 fixed to the casing 12. The internal teeth of the internal-tooth gear are constructed such that an outer pin 11 is loosely fitted to an inner pin hole 13 to allow rotation of outer pin 11.

The inner pin 7 passing through said external-tooth gears 5a, 5b is tightly fitted or fixed to flange 14 of the output shaft 2.

When the input shaft 1 is rotated once, in conjunction the eccentric bodies 3a, 3b rotates once. The external-tooth gears 5a, 5b are apt to in an oscillating manner rotate on an eccentric axis around the input shaft 1 through this one revolution of the eccentric bodies 3a and 3b. However, since the rotation is restricted by the internal-tooth gear 10, the external-tooth gears 5a, 5b almost perform eccentric rotation while being inscribed with the internal-tooth gear 10.

Now, it is assumed that the number of teeth of the external-tooth gears 5a, 5b is N and the number of teeth of the internal-tooth gear 10 is N+1, then the difference between the numbers of teeth is 1. Consequently, the external-tooth gears 5a, 5b are displaced by one tooth relative to the internal-tooth gear 10 fixed to the casing 12 every time the input shaft 1 is rotated. This means that one revolution of the input shaft 1 is decelerated to a revolution of −1/N (− indicates opposite direction of input shaft of the internal-tooth gear.

Oscillation component of the external-tooth gears 5a, 5b is not transmitted due to the clearances between the inner roller holes 6 and the inner rollers 9 and then only the revolution component is transmitted to the output shaft 2 through the inner pins 7.

In this case, the inner roller holes 6a, 6b, inner pins 7 and inner rollers 8 form an "isokinetic inscribed meshing mechanism".

As a result, finally, a reduction of reduction ratio −1/N can be accomplished.

In the example of this prior art, the internal-tooth gear of the inscribed meshing planetary gear construction is fixed, the first shaft is an input shaft and the second shaft is an output shaft. However, a reduction gear can also be constructed by fixing the second shaft and applying the first shaft as an input shaft and the internal-tooth gear as an output shaft. Furthermore, a speed increasing gear can also be constructed by reversing these inputs and outputs.

As described above, the inner pin 7 has a function to form an circular tooth acting as one of elements of said "isokinetic inscribed meshing mechanism" constructed with the inner roller holes 6a, 6b, and also has another function acting as a carrier member for transmitting a rotational force of a rotation of external-tooth gears 5a, 5b to the output shaft 2. In particular, in order to keep a superior former function, it was essential to provide the inner rollers 8 capability of freely rotating around the inner pins 7. The inner roller 8 shows a problem of expensive cost due to the fact that the material must be hard both outer and inner circumferences there for must be coaxially and accurately machined (processed or manufactured).

In view of this fact, an idea has been proposed that the function which forms a circular tooth of one of the elements of the "isokinetic inscribed meshing mechanism" and another function which acts as a carrier member for transmitting a rotational force of the external-tooth gears 5a, 5b to the output shaft 2 are separated, and even if the inner roller 8 is eliminated, it has a similar performance to that of having the inner roller 8. This structure is illustrated in FIGS. 11 and 12.

This structure comprises, as means for transmitting a rotational component of the external-tooth gears, the inner pin 7 arranged in the external-tooth gears 5a, 5b, an annular support ring 17 receiving a rotation corresponding to the rotational component of the inner pin 7 (the rotational component of the external-tooth gears), and a carrier pin 16 projected from the flange 14 formed at the output shaft 2, connected and fixed to the support ring 17.

Said inner pin 7 is rotatably assembled to the flange part 14 and the support ring 17 through bushes 18a, 18b. That is, since the inner pin 7 is not necessarily tightly connected to the output shaft 2 due to the presence of the carrier pin 16, it can be constructed to be rotatable, resulting in that the prior art inner roller 8 can be eliminated. Said annular support ring 17 is assembled to an extremity end portion of said carrier pin 16. Since the carrier pin 16 only has a function to transmit a rotational force of the support ring 17 to the output shaft 2, there are provided through-holes 20a, 20b which do not contact with the carrier pin 16 even if the carrier pin 16 oscillates at the corresponding portion on the external-tooth gear 5a, 5b.

Incidentally, in FIG. 11, reference numerals 15a, 15b denote bearings of the output shaft 2. Reference numeral 21 denotes an inner pin retainer plate for determining an axial position of the inner pin 7. Reference numeral 23 denotes an inner pin retainer plate bolt. Reference numeral 22 denotes a steel plate race.

However, as apparent from FIGS. 9 and 11, a prior art reduction gear was constructed such that a variation in load generated at the reduction mechanism and/or external radial load from a mating machine acting against the output shaft 2 is supported by a pair of bearings 15a, 15b, resulting in that in order to increase a supporting stability, it was necessary to extend the Y segment and shorten the X segment in FIGS. 9 and 11 as much as possible.

However, since it was difficult to shorten the X segment, the Y segment had to be necessarily elongated, resulting in that it had a problem that an axial length of the reduction gear was elongated.

Then, as shown in FIG. 13, it had also been proposed to have a structure in which "a shoulder" 71 and a threads 72 machined at both ends of the inner pin 7A, the annular support ring 17A is integrally formed with the input shaft 1A, the supporting ring 17A and the flange part 14A of the output shaft 2A are connected and fixed by a nut 73, and the reduction mechanism is disposed between the flange part 14A of the output shaft 2A and the support ring 17A (Jap. U. M. Pub. No. Sho 31-9414).

However, such a supporting construction has been constructed such that the shoulder and the threads are machined at the inner pin which is required increased-hardness and an accuracy so as to be threaded engaged with the input shaft and to be fixed to the flange part, and the nut is fastened. Therefore, it has some disadvantages that the machining accuracy or assemblying accuracy is difficult to attain, and the cost is excessively high. Furthermore, the load concentrated at the shoulder section which effect both supporting structures is eliminated, and another countermeasure for preventing loosing of the plate is required whereby a structure is extremely complex. Therefore, the fact is that this prior art structure (FIG. 13) is no comparison for said structure shown in FIGS. 11 and 12.

SUMMARY OF THE INVENTION

The present invention has been invented in view of the prior art's problems and it is an object of the present invention to provide an inscribed meshing planetary gear construction in which the structure is simple while employing supporting structures, a low cost can be attained, a problem of concentration of the load is not produced and it has a superior durability.

It is another object of the present invention to provide an inscribed meshing planetary gear construction having a carrier member, in which the rigidity and stability is high, it has a less number of parts to attain a low cost and to reduce a number of assembling steps.

The present first invention overcomes the aforesaid problem in such a manner. That is, an inscribed meshing planetary gear construction comprises a first shaft, a external-tooth gear eccentrically and rotatably attached to the first shaft through eccentric body mounted on the first shaft, an internal-tooth gear with which the external-tooth gear is inscribed and meshed, a second shaft connected to the external-tooth gear through means for transmitting only a rotating component of the external-tooth gears. As the means for transmitting the rotational component, inner pins acting as an "isokinetic inscribed meshing mechanism" in respect to internal pin holes placed in the external-tooth gear are fixed at their either-ends to a flange part formed in the second shaft, and the other end is fixed to an annular support ring. In the above construction, both the annular support ring and the flange part of the second shaft are supported by the casings through a pair of bearings. Axial position of the flange part, support ring and inner pins is set by holding either one of a part of these three elements by each of inner rings or outer rings of the pair of bearings (claim 1).

The present second invention overcomes the aforesaid problem. An inscribed meshing planetary gear construction comprises the first shaft, a external-tooth gear eccentrically and rotatably attached to the first shaft through eccentric body mounted on the first shaft, internal-tooth gears with which the external-tooth gear is inscribed and meshed, the second shaft connected to the external-tooth gear through means for transmitting only a rotational component of the external-tooth gears. As the means for transmitting the rotational component, inner rollers acting as an isokinetic inscribed meshing mechanism in respect to inner roller holes placed in the external-tooth gear and inner pins passing through the inner roller are fixed at their either-ends to a flange part formed in the second shaft and the other ends are fixed to the annular support ring. In the above construction, both the annular support ring and the flange part of the second shaft are supported at casings through a pair of bearings. Axial position settings of the flange part, the support ring and the inner pins are performed by holding any one of these three elements by each of inner rings or outer rings of the pair of bearings (claim 3).

Preferably, the axial positional settings of the flange part, the support ring and the inner pins are performed in such a manner that both ends of the inner pins are held by respective inner rings of the pair of bearings (claims 2, 4).

The present third invention overcomes the aforesaid problem. That is, an inscribed meshing planetary gear construction comprises a first shaft, a external-tooth gear eccentrically and rotatably attached to the first shaft through an eccentric body mounted on the first shaft, an internal-tooth gear with which the external-tooth gear is inscribed and meshed, a second shaft connected to the external-tooth gears through means for transmitting only a rotational component of the external-tooth gears. As the means for transmitting the rotational component, inner pins acting as an isokinetic inscribed meshing mechanism in respect to inner roller holes placed in the external-tooth gear, an annular support ring for receiving a rotation corresponding to a rotational component of external-tooth gear through the inner pins, and a carrier member projected from the flange part formed in the second shaft and connected and fixed to the supporting ring are provided.

In the above construction, the carrier member is placed through the external-tooth gear, both the annular support ring and the flange part of the second shaft are supported by casings through a pair of bearings, and axial position settings of the flange part, the carrier member, the support ring are performed by holding either one of the three elements by respective inner rings or outer rings of the pair of bearings (claim 5).

The axial position setting of the flange part, carrier member and supporting ring may be performed by holding both ends of the carrier member with respective inner rings of the pair of bearings (claim 6).

In addition, the axial position setting of the inner pins may be performed by holding both ends of the inner pins with respective outer rings of the pair of bearings (claim 7).

In the present first invention, the inner pins passing through the external-tooth gear are supported by the flange part of the second shaft and the annular support ring, and both the support ring and the flange part are supported by the casings through a pair of bearings. As a result, rigidity and stability of the reduction mechanism will be significantly improved while shortening the whole axial length of a speed increasing gear or a reduction gear.

Further, the position setting of the flange part, inner pins and supporting ring in the axial direction is performed so that any one of these three elements (flange part, inner pins, and support ring) is held by each of the inner rings or outer rings of the pair of bearings, whereby the axial position setting of the elements, especially of the inner pins, is securely performed without providing any special member.

In the present first invention, the inner pins are fixed to the second shaft and the support ring, and the inner pins themselves are not rotated respectively. However, since a shape of each of the inner pins are simple columns, it has features;

I) a high accurate machining can be easily carried out with hard raw material,

II) since a reduction mechanism is supported at both ends by a pair of bearings, resulting in that an entire rigidity can be remarkably improved, so that the inner pins can be supported in a quite stable manner.

Accordingly the inner rollers can be left out.

However, when the cost is allowed to be rased, the inner rollers similar to hose of the prior art are covered on outer circumferences of the inner pins so as to cause the "isokinetic inscribed meshing mechanism" in respect to the external-tooth gear to perform a more smooth function, resulting in that the operation becomes more superior (the second invention).

In the present first and second invention, the axial position setting of the flange part, support ring and inner pins is performed by holding "both ends of the inner pins" by the pair of bearings, resulting in that the axial position setting between each of the members, in particular the setting of a distance between both bearings, can be accurate and easy.

When both ends of the inner pins are held by "inner rings of the bearings", the flange part of the second shaft, the inner rings of both bearings, the inner pins and the support rings to be connected without any relative rotation, thereby their rigidities can be improved more and well maintained for a long period of time.

In this way, according to the present first and second inventions;

I) since the reduction mechanism part is supported by a pair of bearings, the whole length of speed increase gear or reduction gear can be shortened, II) since axial position setting of the inner pins is performed by the pair of bearings, the number of component parts and assembly steps can be reduced, III) since a shape of each of the inner pin is simple, a high accurate machining with a hard raw material can be easily obtained at a low cost, and then an expensive inner roller can be left out (without reducing quality or durability) because the inner pins are held in a stable condition in respect to an external radial through both ends supported manner. Incidentally in this case, when the inner rollers are provided, the device will have better quality.

On the other hand, in the present third invention, the carrier member is passed through the external-tooth gears and assembled, the external-tooth gears are held by the annular support ring and the flange part of the second shaft, and then both support ring and the flange part are supported at both ends on the casings through a pair of bearings. As a result, rigidity and stability of the reduction mechanism part can be remarkably improved.

Furthermore, axial position setting of the flange part, the carrier member and the support ring is performed, so that any one of these three elements is held by respective inner rings or respective outer rings of the pair of bearings, whereby the axial position settings of these members can be securely carried out without providing any special members.

In this case, a more superior result can be attained through holding of both ends of the carrier member by the respective inner rings of the bearings. Because, these inner rings of the pairs of bearings and the carrier member have no rotation relative to each other.

If the inner pins are set by a pair of bearings for their axial position settings, more reduction of the number of the parts can be possible. In this case, if the inner pins are held by the outer rings of the pair of bearings, it is possible to make a minimum interference on the circumferential direction of the external-tooth gears between the hole for passing the carrier member of the external-tooth gears and the holes for passing the inner pins.

Thereby, according to the present third invention,

I) a whole length of the reduction mechanism part can be shorten since that the reduction mechanism part is supported at both ends by a pair of bearings;

II) since the axial position of the carrier member and the inner pins are set by the pair of bearings, it is realized to reduce the number of parts and assembly.

III) since the inner pins are supported at both ends and elastically deformed, the errors following after machining and assembling are reduced.

IV) since the (expensive) inner rollers which are essential in the prior art can be left out, the cost reduction is obtain in this method.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Referring now to the accompanying drawings, some preferred embodiments of the present invention will be described in detail.

Figure 1:
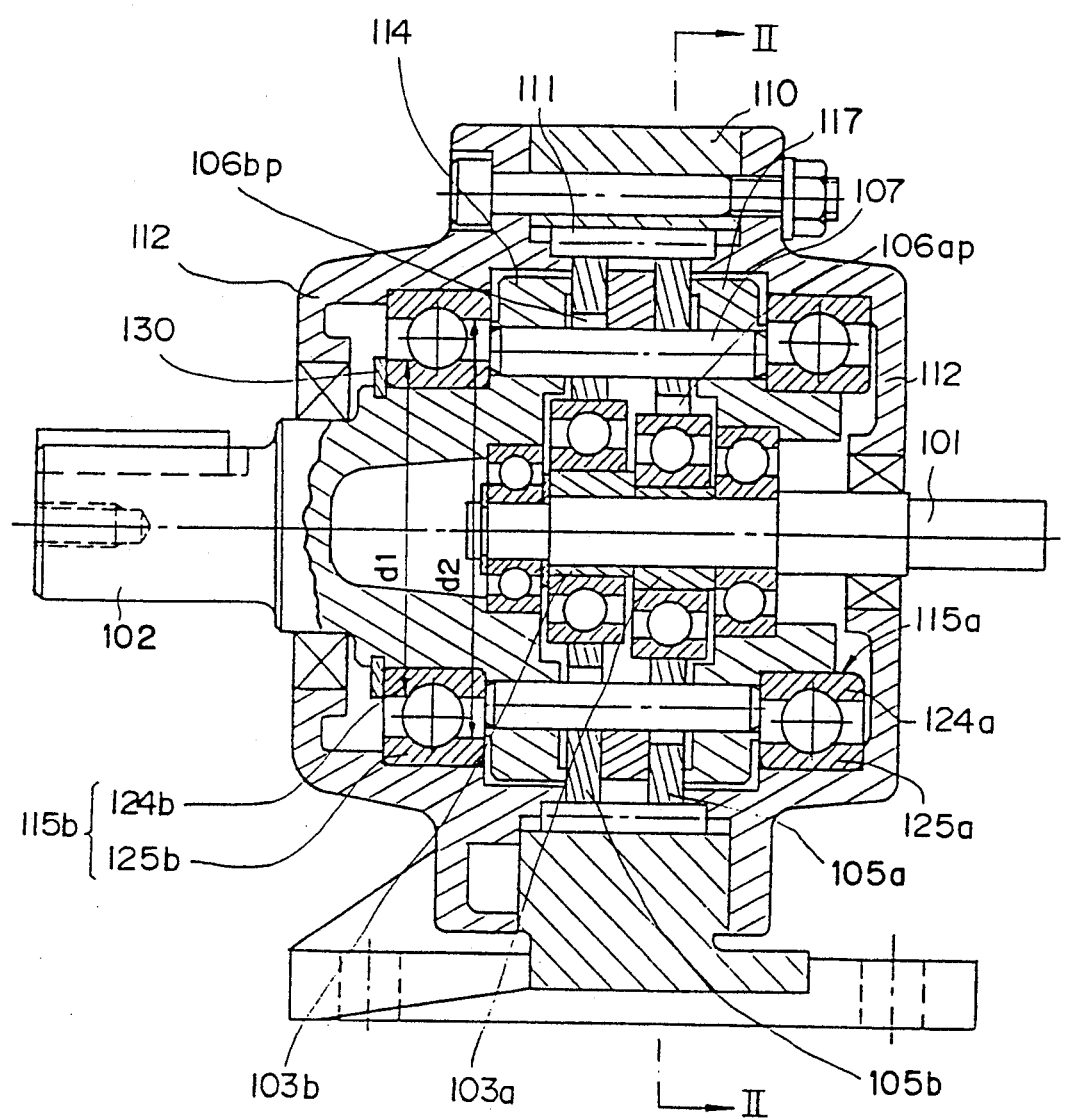
FIG. 1 is a sectional view of a reduction gear to which an inscribed meshing planetary gear construction according to the present first invention is applied.
Figure 2:
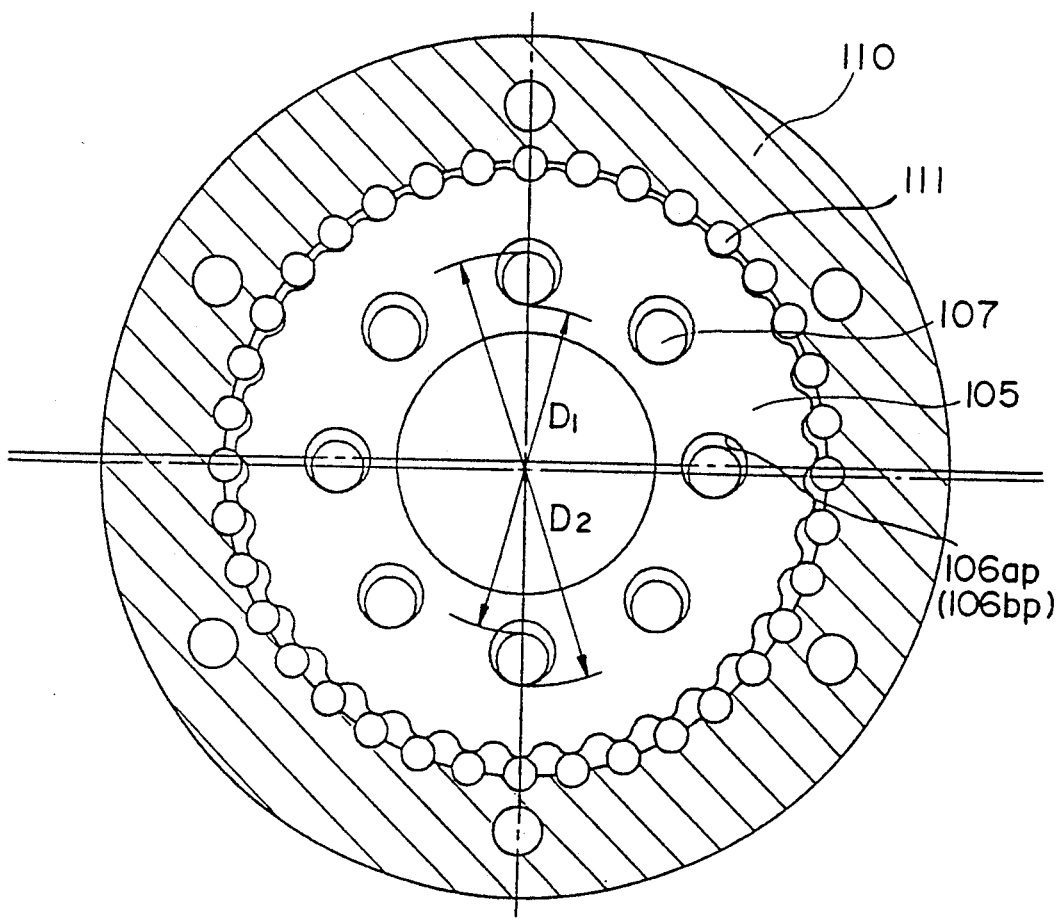
FIG. 2 is a sectional view along a line II—II of FIG. 1.

FIG. 1 is a sectional view showing a reduction gear to which the inscribed meshing planetary gear construction according to the present first invention is applied, and FIG. 2 is a sectional view along a line II—II.

In the following description, the same parts or similar parts as those of the constitution of the above described prior art well-known example will be denoted by numbers having the same tens and ones values.

One end of each of the inner pins 07 is fitted (press fitted) into a flange part 114 of an output shaft 102. The other end of each of the inner pins 107 is fitted (press fitted) into the support ring 117.

The flange part 114, the inner pins 107 and the support ring 117 are supported at both ends on a casing 112 through a pair of bearings 115a and 115b. A whole length of each of all inner pins 107 (eight pieces in the example) is set to the same length, and the bearings 115a and 115b are assembled in such a way that this whole length corresponds to a distance between the pair of bearings 115a and 115b. That is if, axial position of the inner pins 107 (and the flange part 114 and the supporting ring 117 fixed to the inner pins) are set by a pair of bearings 115a and 115b.

More practically, as shown in FIG. 2, the inner pins 107 are set in such a manner that their pitch circle diameter D1 is smaller than an outer diameter d1 of the inner ring of the bearings 115a and 115b, and an outer scribed circle diameter D2 is smaller than an inner diameter d2 of the outer ring of the bearings 115a and 115b. As a result, the inner pins 107 are set only by the inner rings 124a and 124b of the bearings 115a and 115b. Subsequently, the support ring 117, the inner rings 124a and 124b of the bearings 115a and 115b, the inner pins 107 and the flange part 114 do no have any relative rotation so that they can form a strong rigid body, and at the same time, durability acting as a rigid body can be kept for a long period of time.

In the preferred embodiment, although the inner pins 107 are not rotated, their shape is quite simple as different from that of the prior art and a high accurate machining with hard raw material can easily be attained, satisfactory quality can be assured without any inner rollers so that cost reduction can be achieved.

This can be obtained for the first time according to the present invention by the fact that the inner pins 107 are supported at both ends by the flange part 114 supported by the casing through the bearing 115b, and by the support ring 117 supported by the casing through the bearing 115a so as to have a stable construction (in respect to an outer radial load).

Reference numeral 130 in the figure is a stopper ring for assuring connection press fitting) of the bearing 115a, and this stopper ring makes up for a connection between the flange part 114 and the inner pins 107.

Next, action of this reduction gear will be described. It is quite the same as that of the well-known prior art that the external-tooth gears 105a and 105b are oscillatably rotated as the input shaft 101 is rotated, and the rotation of the input shaft 101 is reduced because of the external-tooth gears 105a and 105b through engagement of the outer pins 111 corresponding to the internal-tooth of the internal-tooth gear 110, and external-tooth gears 105a and 105b. Oscillating component of the rotation of the external-tooth gears 105a and 105b is absorbed by the clearances between the inner pin holes 106ap and 106bp and the inner pins 107, and only the tangential component of the external-tooth gears 105a, 105b is transmitted to the flange part 114 of the output shaft 102 through the inner pins 107. At this time, the support ring 117 equalizes the load of each of the inner pins 107.

The outer radial load acting against the output shaft 102 is received by the bearing 115a and the bearing 115b (through the inner pins 107). The inner pin 107 has a simple shape without any shoulder or thread. However, the inner rings 124a and 124b of the bearings 115a and 115b are existed in the axial direction to hold the inner pins 107 so that the inner pins 107 can not be moved toward the input shaft or output shaft.

Although in the preferred embodiment described above, an isokinetic inscribed meshing mechanism with the inner pin holes 106ap and 106bp of the external-tooth gear is constituted by the fixed inner pins 107, it is more preferable to cover the outer circumference of each of the inner pins by the inner rollers 108 in the same manner as that of the prior art in order to provide a more smooth application of the function of the isokinetic inscribed meshing mechanism. This corresponds to the present second invention.

Figure 3:
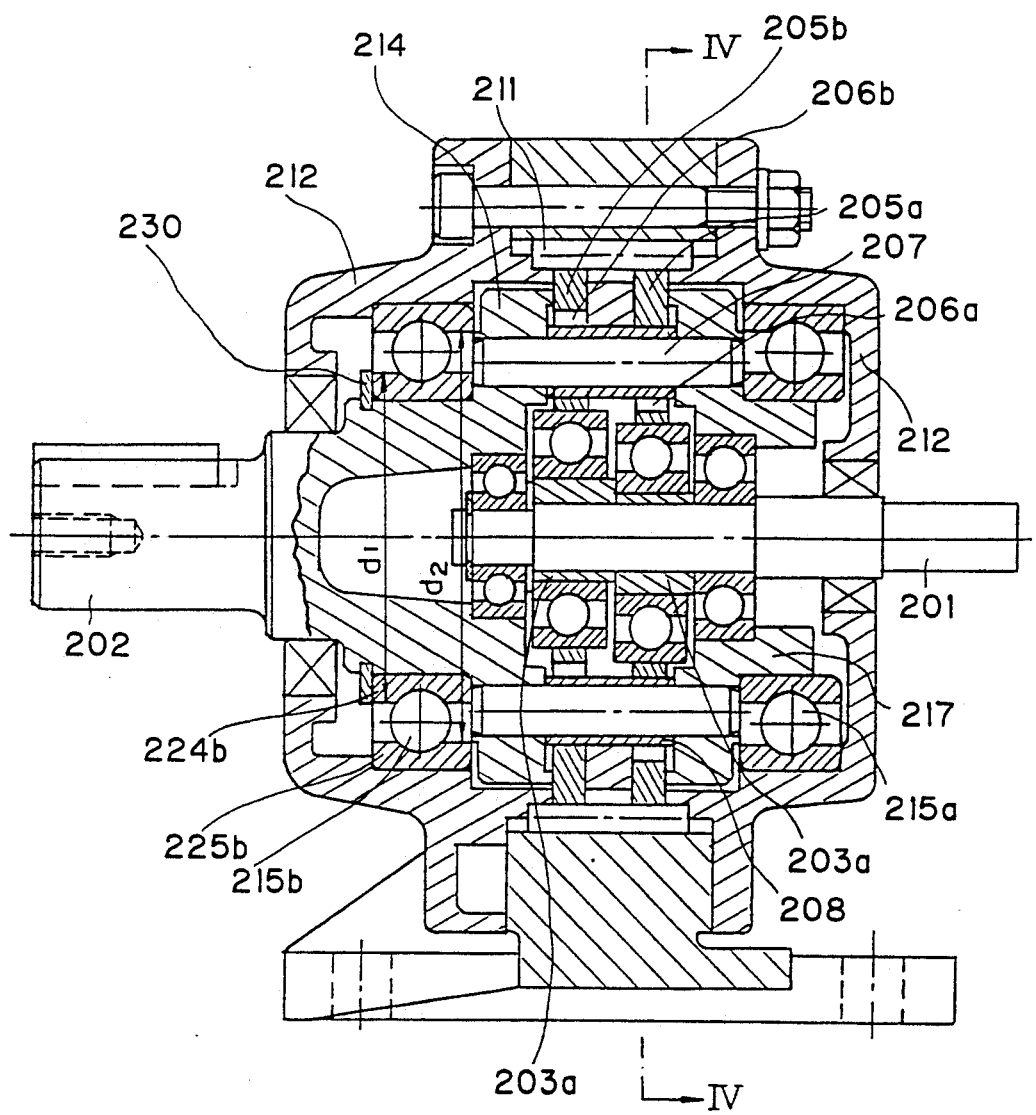
FIG. 3 is a sectional view of a reduction gear according to preferred embodiment of the present second invention.
Figure 4:
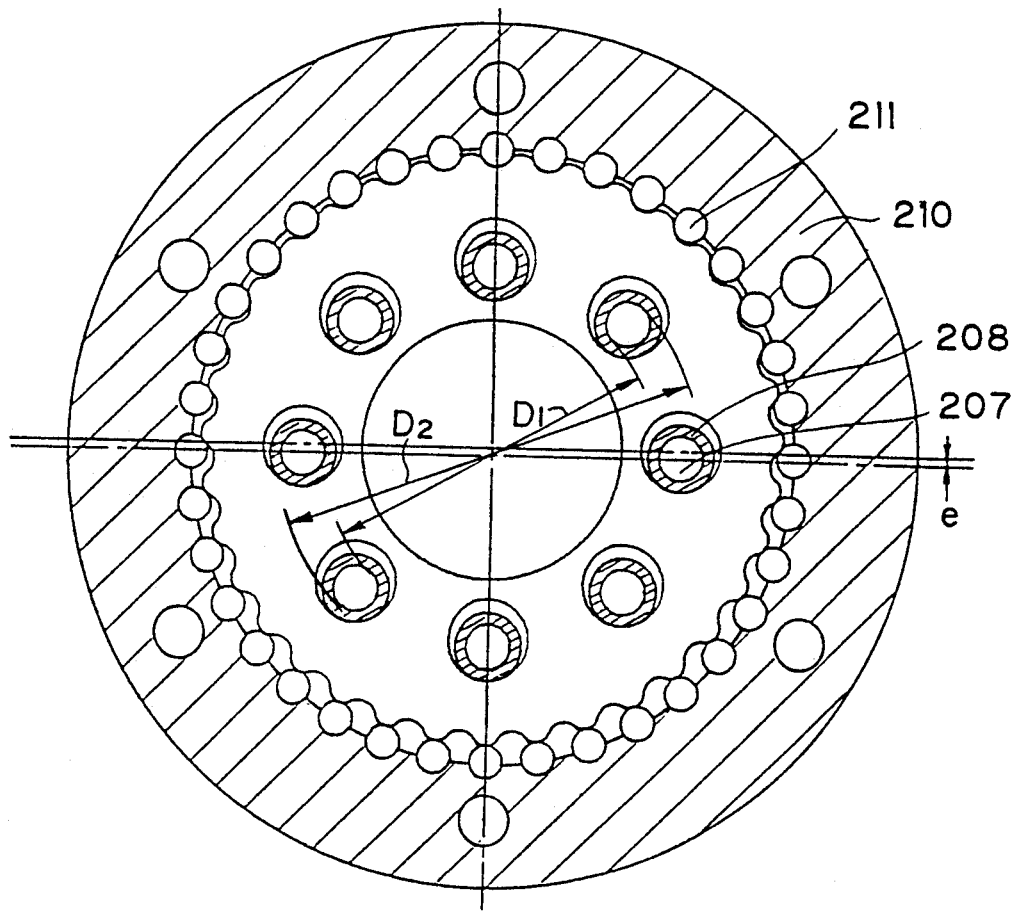
FIG. 4 is a sectional view along a line IV—IV of FIG. 3.

The preferred embodiment of the present second invention is shown in FIGS. 3 and 4. The present preferred embodiment is all the same as that of the preferred embodiment described above except that the inner roller 208 covers each of the inner pins 207, and the isokinetic inscribed meshing mechanism is formed by the inner pins 207, the inner roller holes 206a and 206b. Therefore, the same reference numerals of the tens and ones place are applied to the same parts in the figures and their duplicate description will be omitted. According to the preferred embodiment, since a sliding between the inner pins 207 and the inner roller holes 206a and 206b can be absorbed by the inner rollers 208, it is possible to acquire a reduction gear having superior efficiency and durability.

In addition, in the preferred embodiment described above, the inner pins 207 are passed and press fitted to the flange part 214 and the support ring 217, and both ends of the inner pins 207 are held by a pair of bearings 215a and 215b. However, in the present invention, the inner pins 207 are not necessarily required to pass the flange part 214 or the support ring 217.

Figure 5:
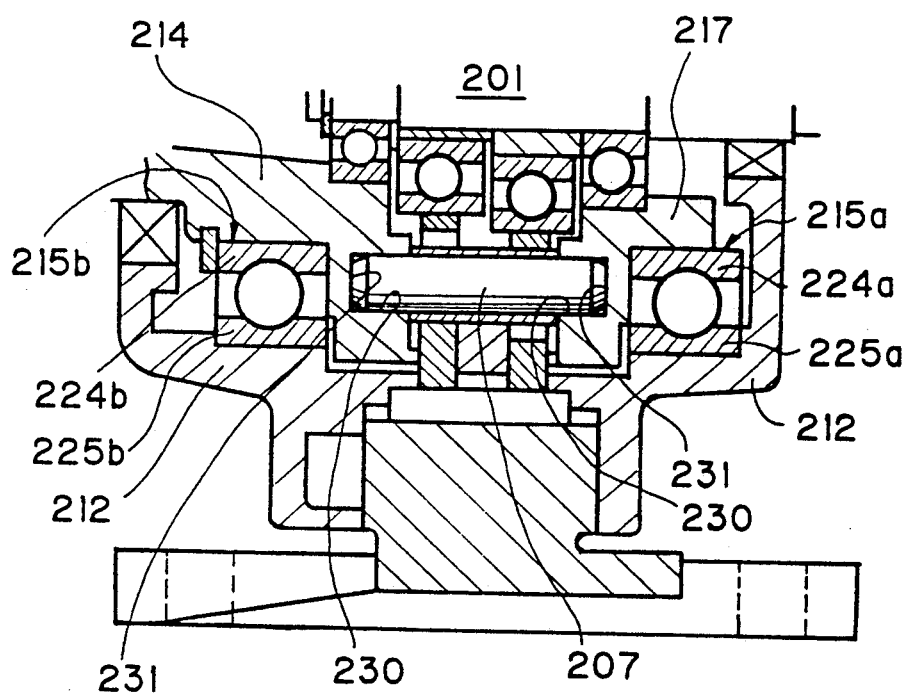
FIG. 5 is a partial sectional view showing another example of a connected state of a flange part, a support ring and inner pins.

For example as shown in FIG. 5, either the flange part 214 or the supporting ring 217 is formed with a hole 230 having a limited depth the inner pin 207 is fitted into the hole until it contacts with the bottom 231 of the hole 230, and at the same time, the position setting in the axial direction may be carried out by holding a part of the flange part 214 or the support ring 217 by a pair of bearings 215a and 215b.

Figure 6:
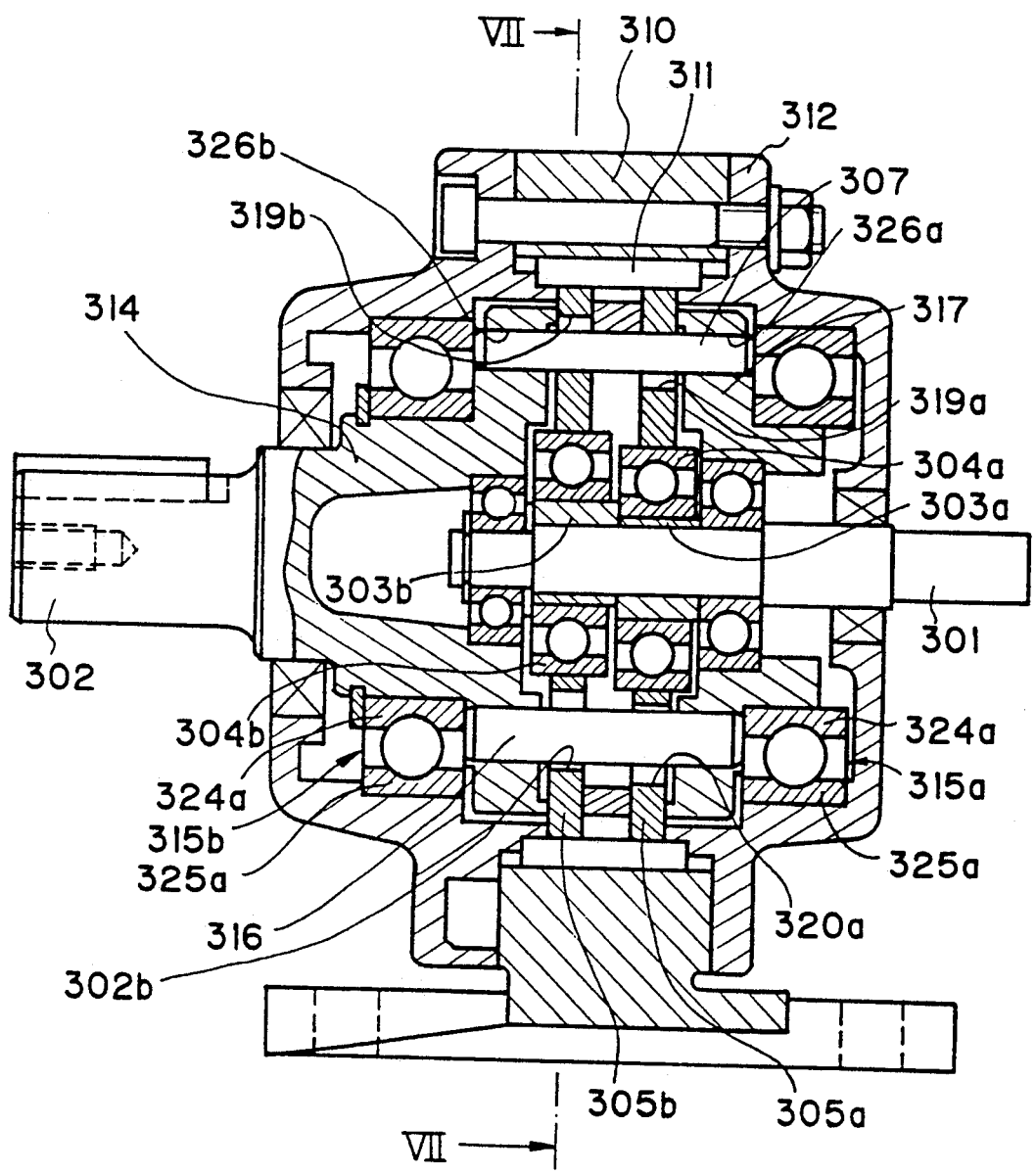
FIG. 6 is a sectional view showing a reduction gear to which an inscribed meshing planetary gear construction according to the present third invention is applied.
Figure 7:
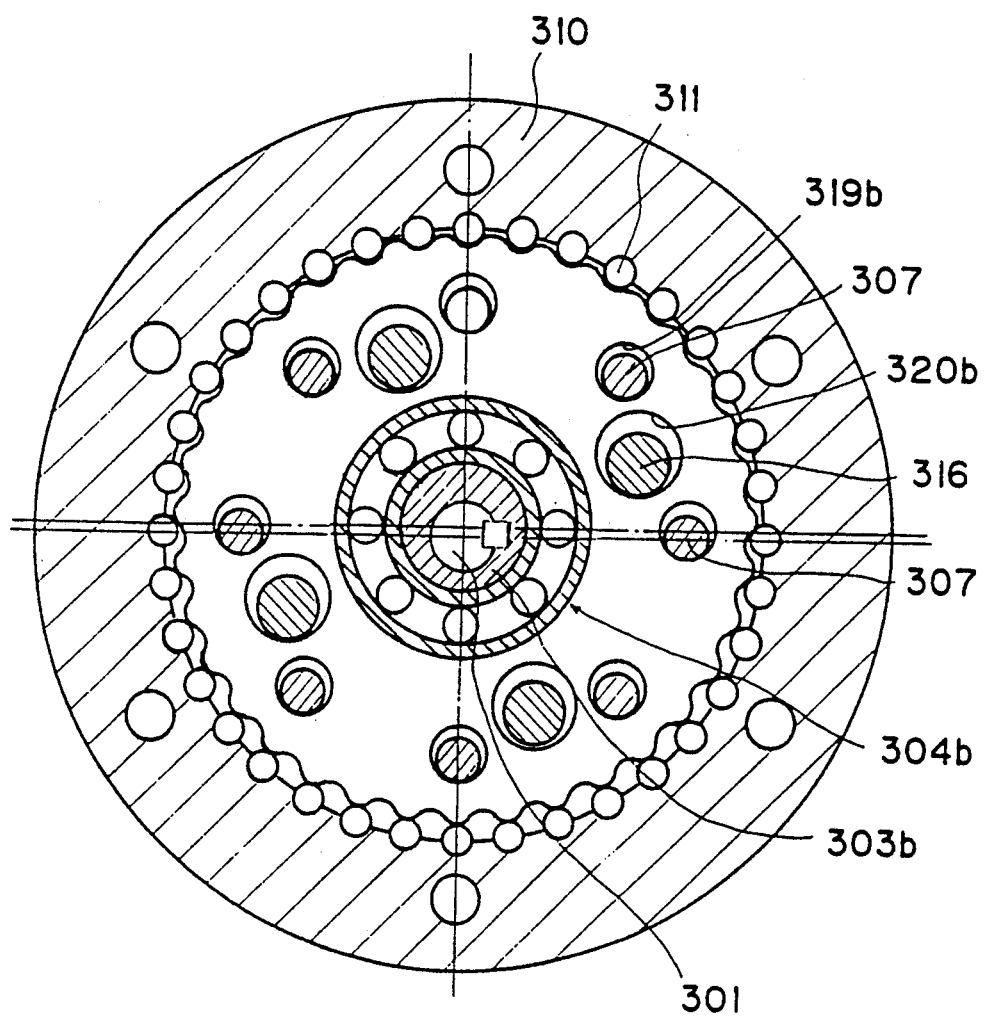
FIG. 7 is a sectional view along a line VII—VII of FIG. 6.

FIG. 6 shows a sectional view of the reduction gear to which the inscribed meshing planetary gear construction according to the present third invention is applied. FIG. 7 is a sectional view along a line VII—VII.

In the following description, the same or similar parts as that of the constitution described above will be denoted by the same numbers of tens and ones values.

One end of each of a carrier pins (carrier members) 316 which are separated from the flange part 314 is fitted (press fitted) to the flange part 314 of the output shaft 302. The support ring 317 is fitted (press fitted) to the other end of each of the carrier pins 316, and a carrier is constituted by the support ring 317 and the carrier pins 316.

The flange part 314, the carrier pins 316 and the support ring 317 are supported at both ends on the casing 312 through a pair of bearings 315a and 315b. A whole length of the carrier pins 316 and a whole length of the inner pins 307 are set to the same, and then the bearings 315a and 315b are assembled in such a way that the whole length coincides with a distance between the bearings 315a and 315b. That is, axial position settings of the carrier pins 316 and the inner pins 317 are carried out by the pair of bearings 315a and 315b.

More practically the position setting of the carrier pins 316 is carried out by the inner rings 324a and 324b of the bearings 315a and 315b. As a result, each of the support ring 317, the inner rings 324a and 324b of the bearings 315a and 315b, the carrier pins 316 and the flange part 314 has no relative rotation, whereby durability of the rigid member can be kept for a long period of time.

In view of the function of the isokinetic inscribed meshing mechanism, since the inner pins 307 can not be avoided of relative rotation in the inner rings 324a and 324b as well as the outer rings 325a and 325b, the inner pins 307 are held by the outer rings 325a and 325b in order to avoid circumferential interferences between the carrier pin holes (through-holes) 320a and 320b formed in the external-tooth gears 305a and 305b and the inner pin holes 319a and 319b also formed in the external-tooth gears 305a and 305b. As a result, as shown in FIG. 7, since the carrier pin holes 320a and 320b and the inner pin holes 319a and 319b may not be formed on the same circumferences of the external-tooth gears 305a and 305b, it is advantageous in view of the strength.

The inner pins 307 are rotatablly assembled in the flange part 314 and the inner pin holding holes 326a and 326b of the support ring 317, so that a superior isokinetic inscribed meshing mechanism may be formed with the inner pin holes 319 without any inner rollers.

Since another constitution is substantially similar to that of the example described above, the same reference numerals at lower two digits are merely applied to the same or similar portions in the figures, and their duplicate description will be omitted.

Next, action of this reduction gear will be described.

It is quite similar action to that of the described example that the external-tooth gears 305a and 305b are oscillatably rotated in response to the rotation of the input shaft 301, and the rotation of the input shaft 301 becomes a reduced rotation of each of the external-tooth gears 305a and 305b through an engagement of the outer pins 311 corresponding to the inner tooth of the internal-tooth gear 310 with the external-tooth gears 305a and 305b.

When the external-tooth gears 305a and 305b are rotated, their oscillating components are absorbed by clearances between the inner pin holes 319a and 319b and the inner pins 307, and only a self-rotating component is transmitted to the flange part 314 of the output shaft 302 and the support ring 317 through the inner pins 307. The rotational force transmitted to the support ring 317 is transmitted to the output shaft 302 through the carrier pin 316.

Outer radial load acting against the output shaft 302 is received at both ends by the bearing 315a, and the bearing 315a through the carrier pin 316 and the support ring 317, so that the outer radial load does not influence against the inner pins 307.

Since the inner pins 307 are freely fitted to the flange part 314 of the output shaft 302 and the inner pin holding holes 326 of the support ring 317, the inner pins 307 can freely be rotated, thereby a sliding generated between the inner pin holes 319a and 319b and the inner pins 307 can be well absorbed even if the inner roller 8 may not be exist).

Since the inner pins 307 are freely supported at both ends, an elastic deformation may easily generated when a load is accepted through of the inner pin holes 319a and 319b, thereby errors caused by machining and assembling can be well absorbed. In addition, even if the inner pins 307 are elastically deformed, since rigidity of the whole reduction gear is secured by the flange part 314, the carrier pins 316 and the support ring 317 which are supported at both ends on the casing 312 (not by the inner pins 307), a quite stable operation can be continued.

Although the inner pins 307 are freely supported at both ends, their axial position are set by the outer rings 325a and 325b of the bearings 315a and 315b, whereby the inner pins 307 are not allowed to be pulled out.

On the other hand, the carrier pin 316 is closely fitted to the flange part 314 of the output shaft 302 and the support ring 317, and at the same time their axial position are set by the inner rings 324a and 324b of the bearings 315a and 315b, so that the carrier pin 316 can not be moved out. Since the axial position of the carrier pin 316 is set by the inner rings 324a and 324b as described above, the inner rings 324a and 324b, the support ring 317, the carrier pin 316 and the flange part 314 do not have relative rotation at all, thereby durability of a rigid member can be kept for a long period of time.

Figure 8:
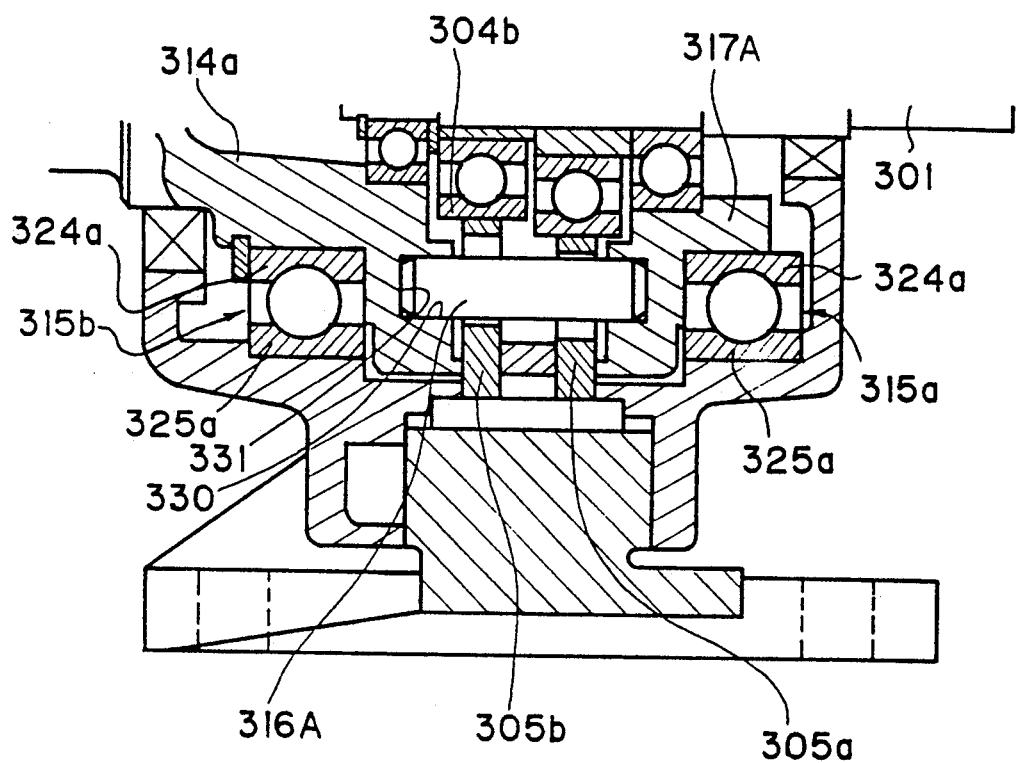
FIG. 8 is a sectional view showing a part near the carrier pin (a carrier member) for showing another preferred embodiment of the present third invention.
Figure 9:
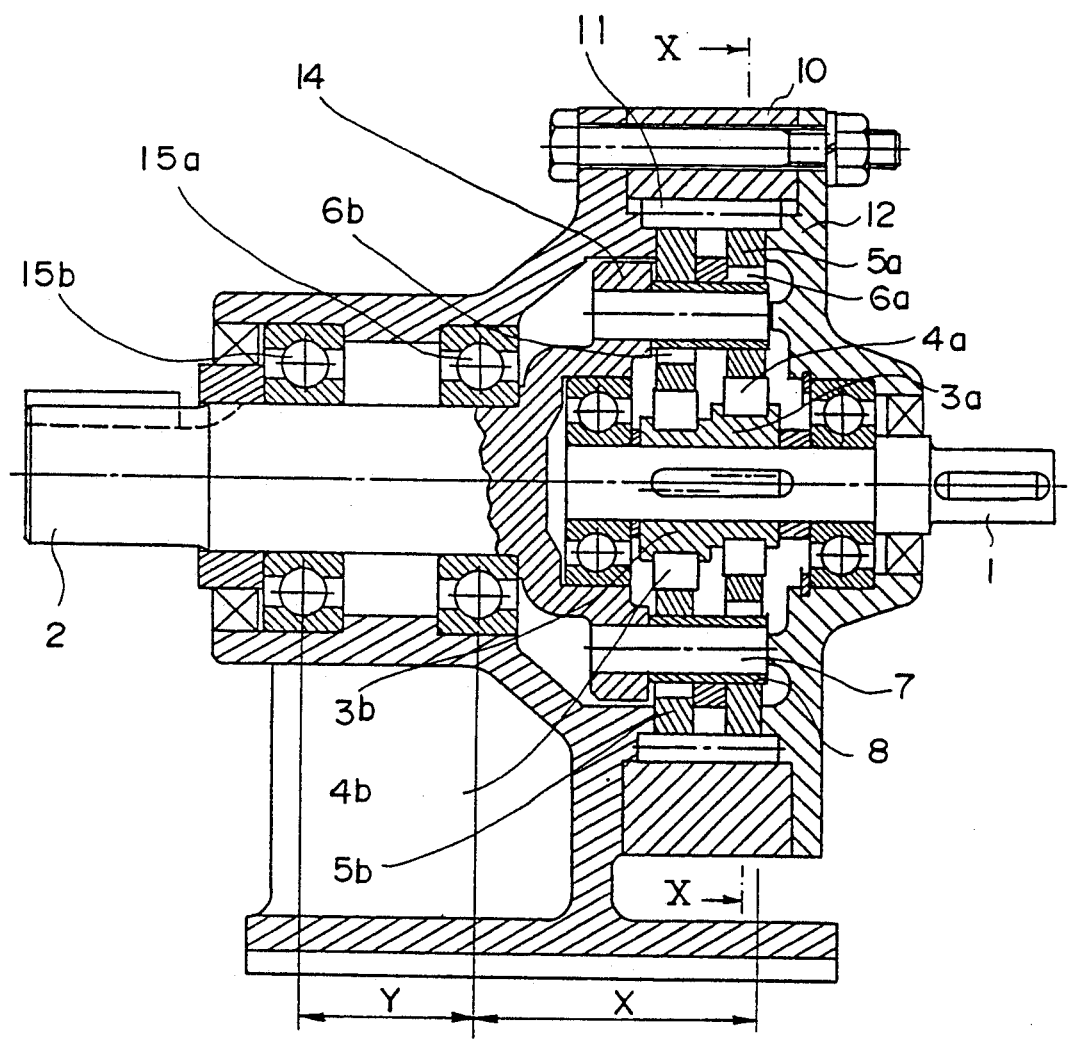
FIG. 9 is a sectional view showing a fundamental reduction gear to which the prior art inscribed meshing planetary gear construction is applied.
Figure 10:
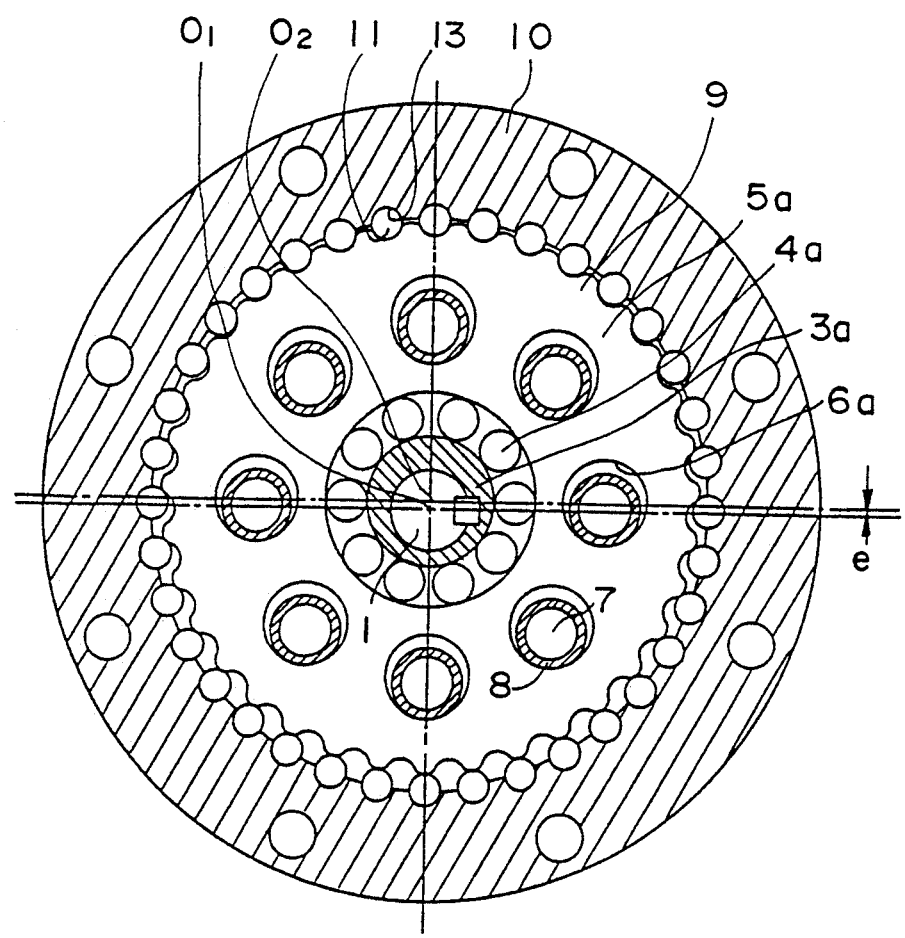
FIG. 10 is a sectional view along a line X—X of FIG. 9.
Figure 11:
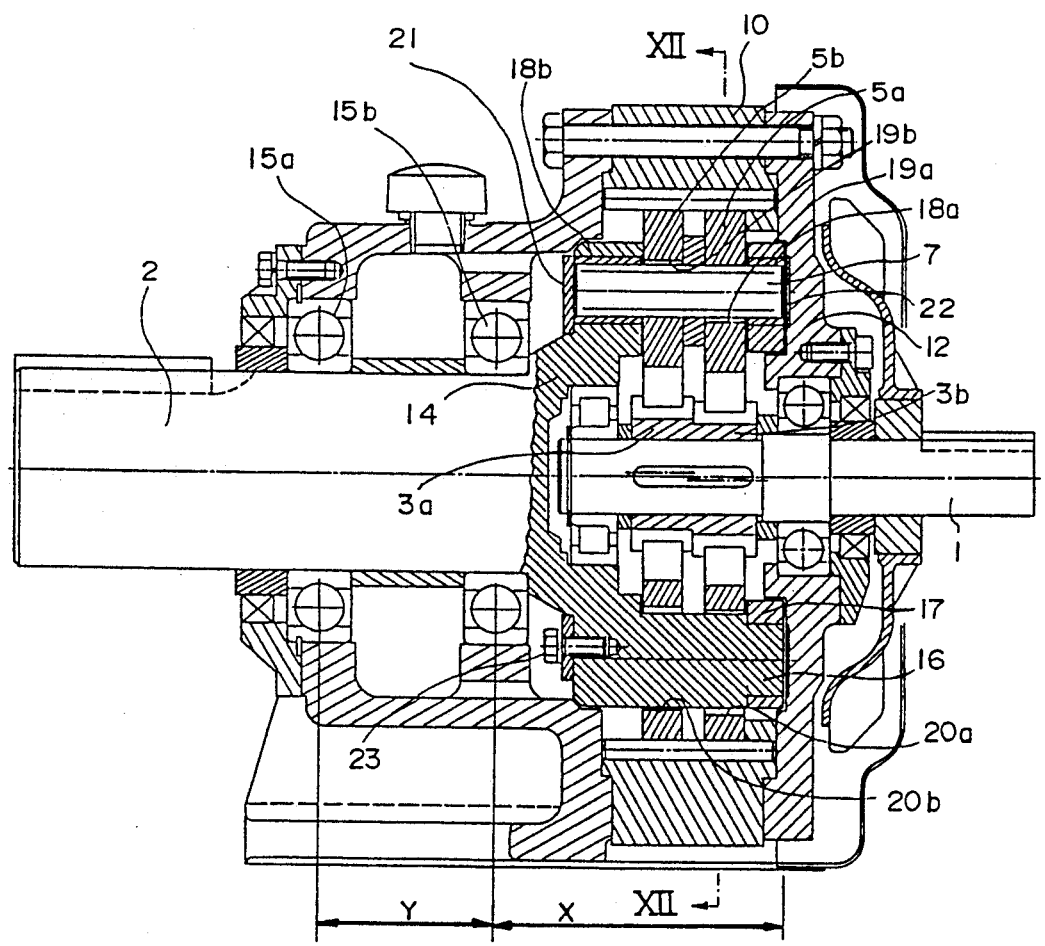
FIG. 11 is a sectional view showing a reduction gear to which the prior art inscribed meshing planetary gear construction having carrier pins in addition to inner pins is applied.
Figure 12:
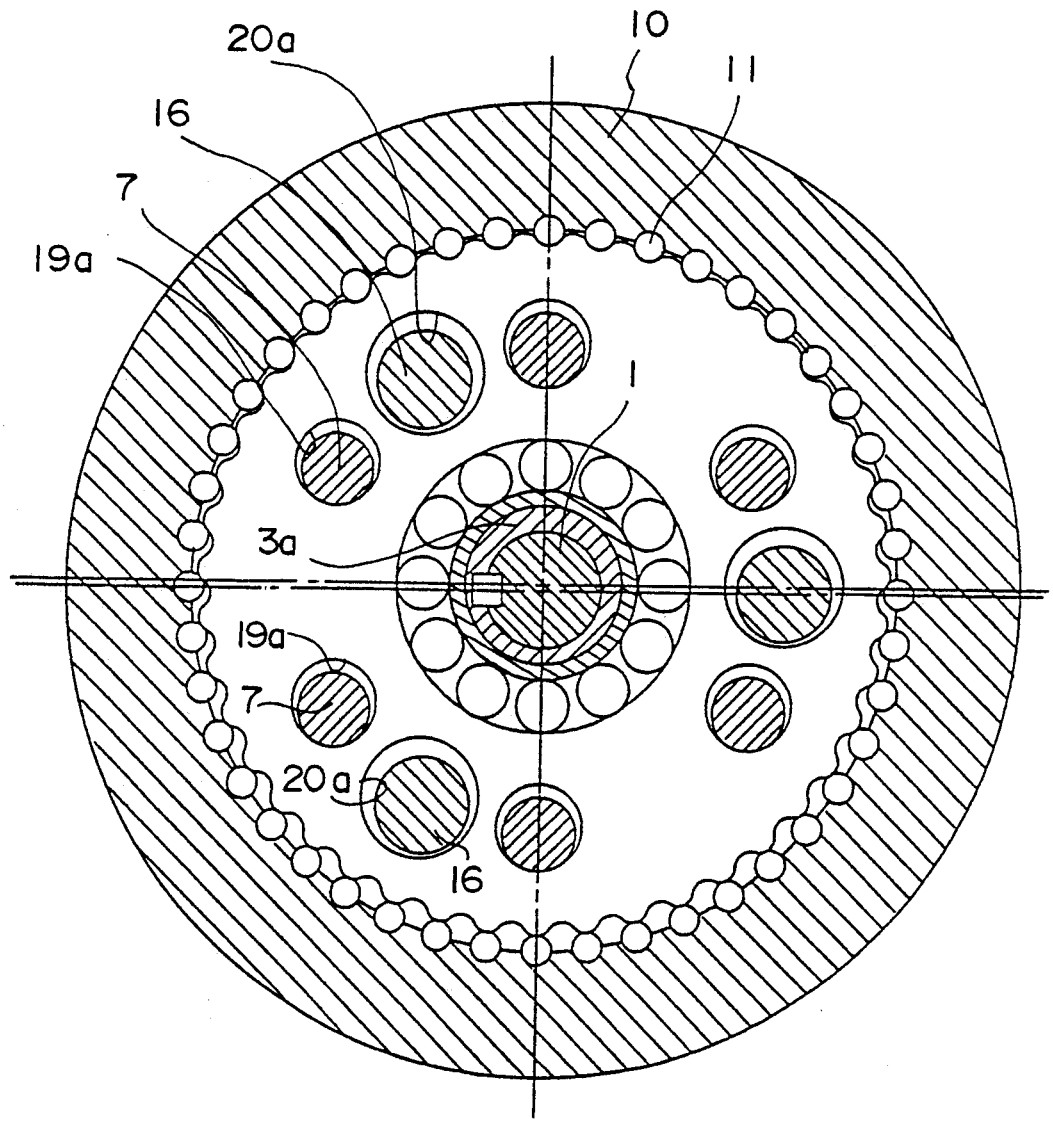
FIG. 12 is a sectional view along a line XII—XII of FIG. 11.
Figure 13:
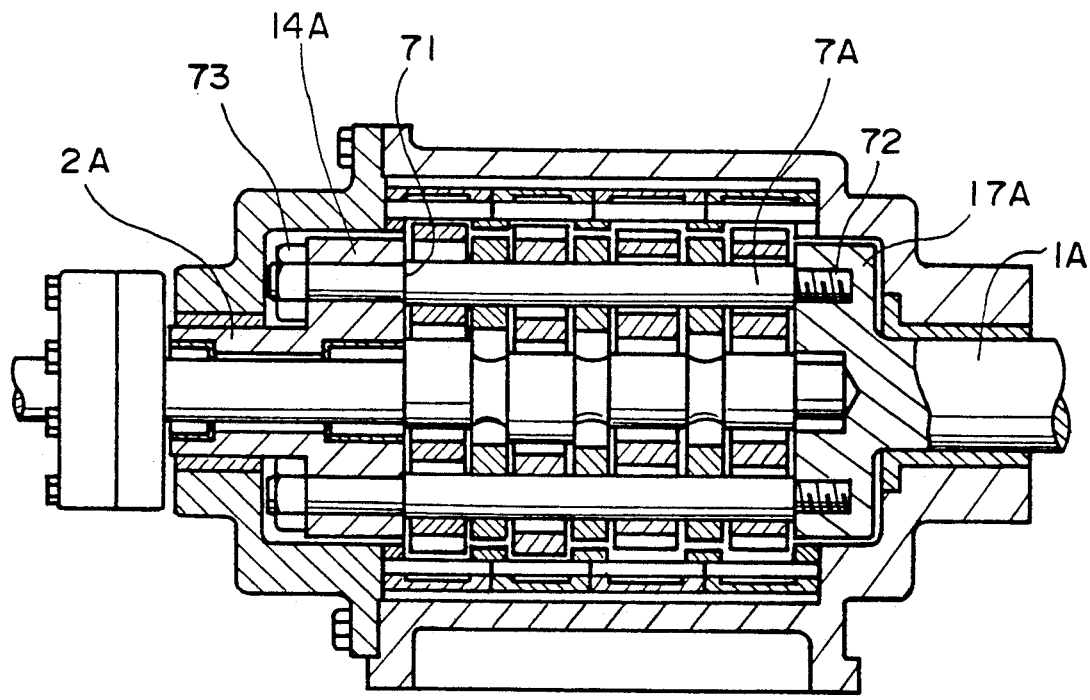
FIG. 13 is a sectional view showing another example of a reduction gear to which the prior art inscribed meshing planetary gear construction is applied.

In the aforesaid preferred embodiment, the carrier pin 316 is passed through the flange part 314 and the support ring 317, and both ends of the carrier pin 316 are held by a pair of bearings 315a and 315b. However, in the present third invention, the carrier pin 316 is not necessarily passed. As shown in FIG. 8 for example, holes 330 having limited depth are formed on the flange part 314A or the supporting ring 317A, and then carrier pins 316A are fitted into the holes 330 until they contact with the bottom 331 of the holes 330. At the same time, their position settings in the axial direction may be carried out by holding the flange part 314A or the support ring 317 by a pair of bearings 315a and 315b.

While the invention has been described with reference to specific embodiments, their descriptions are illustrative and are not to be constrcted as limiting the scope of the invention. Various modifications and changes may occur to those skilled in the art without departing from the spirit and scope of the invention as defined by the appended claims.

What is claimed is:

1. An inscribed meshing planetary gear construction, comprising:

a first shaft;

an eccentric body mounted on the first shaft;

an external-tooth gear eccentrically and rotatably attached to the first shaft through the eccentric body;

an internal-tooth gear with which the external-tooth gear is inscribed and meshed;

a second shaft connected to the external-tooth gear through means for transmitting only a rotating component of the external-tooth gear, said means for transmitting only a rotating component comprising inner pins acting as an isokinetic inscribed meshing mechanism in respect to internal pin holes placed in said external-tooth gear, said inner pins being supported at their either-ends by a flange part formed in the second shaft, and at the other ends by an annular support ring, wherein both said annular support ring and said flange part of the second shaft are supported to a casing through a pair of bearings, said pair of bearings having inner rings and outer rings, and wherein an axial position of the inner pins is set in such a manner that both ends of the inner pins are held by one of respective inner rings and outer rings of said pair of bearings.

2. An inscribed meshing planetary gear construction comprising:

a first shaft;

an eccentric body mounting on the first shaft;

an external-tooth gear eccentrically and rotatably attached to the first shaft through the eccentric body;

an internal-tooth gear with which are external-tooth gear is inscribed and meshes; and a second shaft connected to the external-tooth gear through means for transmitting only a rotational component of the external-tooth gear, said means for transmitting only a rotating component comprising inner rollers acting as an isokinetic inscribed meshing mechanism in respect to inner roller holes placed in said external-tooth gear, and inner pins passing through the inner rollers and supported at either-ends by a flange part formed in the second shaft and at the other ends by an annular support ring, wherein both said annular support ring and said flange part of the second shaft are supported at a casing through a pair of bearings, said pair of bearings having inner rings and outer rings, and wherein an axial position of inner pins is set in such a manner that both ends of the inner pins are held by one of respective inner rings and outer rings of said pair of bearings.

3. An inscribed meshing planetary gear construction comprising:

a first shaft;

an eccentric body mounted on the first shaft;

an external-tooth gear eccentrically and rotatably attached to the first shaft through the eccentric body;

an internal-tooth gear with which the external-tooth gear is inscribed and meshed;

a second shaft connected to the external-tooth gear through means for transmitting only a rotational component of the external-tooth gear, said means for transmitting only a rotating component comprising inner pins acting as an isokinetic inscribed meshing mechanism in respect to inner holes placed in said external-tooth gear, an annular support ring for receiving a rotation corresponding to a rotational component of the external-tooth gear through the inner pins, and a carrier member projected from a flange part formed in the second shaft, and connected and fixed to the support ring, wherein said carrier member is placed through the external-tooth gear, both the annular support ring and the flange part of the second shaft are supported at a casing through a pair of bearings, said pair of bearings having inner and outer rings, and wherein an axial position of the inner pins is set by holding both ends of said inner pins by one of respective inner rings and respective outer rings of said pair of bearings.

* * * * *